Patent text

3,038,919
THERMAL STABILIZATION OF ALKYLLEAD COMPOUNDS
Shirl E. Cook and Hymin Shapiro, Baton Rouge, La., assignors to Ethyl Corporation, New York, N.Y., a corporation of Delaware
No Drawing. Filed Sept. 1, 1960, Ser. No. 53,355
12 Claims. (Cl. 260—437)

This invention relates to the thermal stabilization of alkyllead compounds. More particularly, it relates to alkyllead compositions which are stable at temperatures as high as 180–195° C.

In U.S. 2,660,591–2,660,596, inclusive, there are described a series of inventions relating to the thermal stabilization of alkyllead compounds during various manufacturing and related operations. These prior inventions primarily related to the stabilization of tetraethyllead during the separation step in its manufacture wherein the tetraethyllead is distilled (100° C.) from the reaction products accompanying its synthesis. This objective was accomplished by using a small amount of a chemical compound described in those patents as a thermal stabilizer. So successful were these inventions that the problems connected with thermal instability of tetraethyllead in its manufacture and related operations have largely vanished. In fact, naphthalene has had a relatively long and very successful commercial career as a tetraethyllead thermal stabilizer for the above distillation operation.

More recently a new set of conditions and problems have arisen in connection with the thermal stabilization of alkyllead compounds. These have resulted from the pioneering discovery that pure—i.e. halogen scavenger-free—alkyllead compounds provide distinct and very important improvements in engine operation when dissolved in certain types of base fuels. This discovery is revolutionary. If put into commercial practice it would give rise for the first time to the sale in large-sized quantities of tetraalkyllead compounds undiluted by their conventional halide scavenger complement.

Prior commercial practice has been to provide alkyllead antiknock compounds blended with an organic halide scavenger complement. About 35 percent by weight of the commercial antiknock fluid compositions has been composed of either ethylene dibromide or a mixture of ethylene dibromide and ethylene dichloride as the scavenger. Although designed primarily to overcome certain engine problems, these scavengers have conferred upon the resultant antiknock fluid composition a very substantial degree of thermal stability. Consequently the elimination of such substantial amounts of scavenger components from the antiknock mixture results in the elimination of the thermal stability protection heretofore afforded by the scavenger. In fact, the resultant pure alkyllead compound is a liquid monopropellant—that is, it can undergo a spontaneous and highly exothermic decomposition, liberating a large volume of hot gas. Hence when a critical mass of alkyllead compound under partial confinement is brought up to a sufficient temperature, it will then heat itself up and explode.

The problem of effectively inhibiting the above-described thermal decomposition is critical to the commercialization of the new antiknock additive because in commercial use the additive would be shipped and stored in much the same way as present scavenger-containing alkyllead antiknock fluids. Unless the new antiknock additive were properly stabilized against thermal decomposition and unless it had essentially the same thermal stability as the presently-sold antiknock fluids, the consequences could be disastrous. Therefore, it has been concluded that the new scavenger-free alkyllead compositions must have pronounced stability at temperatures as high as 180–195° C. at which temperatures the decomposition rate of pure alkyllead compounds is normally extremely high.

Although, as shown by U.S. 2,660,595, naphthalene is a very effective thermal stabilizer of lead alkyls at 130° C., even this commercially successful thermal stabilizer has little or no effectiveness at 180° C. and is worthless at 195° C. Consequently there is a paramount need extant for an effective means of effectively stabilizing undiluted alkyllead compounds against thermal decomposition at temperatures in the range of 180–195° C.

An object of this invention is to fulfill the foregoing need. Another object is to provide alkyllead compositions which have substantial stability even at temperatures as high as 180–195° C. Other important objects of this invention will be apparent from the ensuing description.

The above and other objects of this invention are accomplished by providing an alkyllead compound normally susceptible to rapid thermal deterioration at temperatures in the range of 180–195° C. having admixed therewith a novel and highly efficient thermal stabilizer complement in amount sufficient to exhibit such decomposition. One ingredient of the thermal stabilizer complement is a sterically-hindered phenol, that is, a phenolic compound having a total of at least 4 carbon atoms in a position ortho to the phenolic hydroxyl group(s). Such characterization and terminology as well as numerous phenolic compounds included within this category are well known to those skilled in the art. See, for example, U.S. Patent 2,202,877.

The other ingredient used in the thermal stabilizer complement of this invention is at least one of the following materials:

(1) Fused ring aromatic hydrocarbons containing from about 9 to about 24 carbon atoms in the molecule;

(2) Azoaromatics in which two aromatic hydrocarbon nuclei, each containing from 6 to about 12 carbon atoms, are chemically bonded to an azo linkage;

(3) Alkane diols containing up to about 12 carbon atoms in the molecule;

(4) Perhaloalkanes containing from 2 to about 4 carbon atoms in the molecule and in which the halogen is taken from the group consisting of chlorine and bromine;

(5) Alkyl thiocyanates containing up to about 12 carbon atoms in the molecule; and (6) Aralkene hydrocarbons containing from 8 to about 16 carbon atoms in the molecule.

From an overall cost effectiveness viewpoint, the sterically-hindered phenol preferably contains in the molecule (a) only carbon, hydrogen, and oxygen, (b) from 10 to about 36 carbon atoms, and (c) from 1 to 2 phenolic hydroxyl groups. Tert-butylated, sterically-hindered phenolic compounds, particularly 2,6-di-tert-butylated phenolic compounds are especially preferred in the practice of this invention since they cooperate most efficiently with the other material in the thermal stabilizer complement to provide the greatest benefits characterizing this invention. Examples of such particularly preferred compounds are 2,6-di-tert-butyl phenol, 4-methyl-2,6-di-tert-butyl phenol, 4,4'-methylene-bis(2,6-di-tert-butyl phenol), and 2,2',6,6'-tetra-tert-butyl-p,p'-biphenol.

Although very good results are achieved by the use of any of the above-enumerated non-phenolic ingredients of the thermal stabilizer complements of this invention, the use of certain types thereof is particularly advantageous and therefore especially preferred. One especially outstanding group of such materials is a plurality of different fused ring hydrocarbons having boiling points at atmospheric pressure of at least about 180° C. and containing up to about 20 carbon atoms in the molecule. Illustrative of such compositions are such mixtures as methyl naphthalene and dimethyl naphthalene; 1,2,3,4-tetrahydronaphthalene and anthracene; ethyl naphthalene, 1,4-dihydronaphthalene and fluorene; and commercially available hydrocarbon mixtures which contain alkylated naphthalenes and related fused ring hydrocarbons. Such materials even when used by themselves as thermal stabilizers for alkyllead compounds have tremendous effectiveness in this capacity, and when combined with the phenolic ingredient as above described, the resultant composition provides a greatly magnified amount of thermal stabilizer effectiveness. In addition, these fused ring aromatic hydrocarbon mixtures are plentiful and inexpensive.

The use of the above-described perhaloalkanes and alkyl thiocyanates likewise constitute preferred embodiments of this invention because the association therewith of sterically-hindered phenolic compounds results in very sharp increases in effectiveness as compared with the effectiveness of either the perhaloalkane or the alkyl thiocyanate when used alone (i.e. in the absence of the phenolic ingredient) to stabilize alkyllead compounds against thermal decomposition.

Among the features of this invention is the fact that the above thermal stabilizer complements confer upon the resultant scavenger-free alkyllead antiknock fluid excellent stability characteristics even at 180–195° C. where under normal circumstances explosive thermal decomposition would occur quite rapidly and with great violence. Furthermore, the particularly preferred compositions of this invention have thermal stability characteristics which are comparable to those of the presently sold scavenger-containing antiknock fluids. In addition, the foregoing stability benefits are achieved at low cost, in fact, in many instances at lower cost than the thermal stability achieved in the present day antiknock fluid compositions.

An especially unusual feature of this invention is the fact that when used by themselves the above-hindered phenols have been found to have absolutely no effectiveness whatsoever as thermal stabilizers for alkyllead compounds. In other words, the important benefits flowing from this invention definitely appear to be the result of a beneficial coaction between the non-phenolic ingredient and the normally insipid sterically-hindered phenolic ingredient.

The following constitute typical examples of the compositions of this invention. In these examples, all percentages are by weight and are based on the weight of the alkyllead compound. Also, in each example, the alkyllead component is halogen-scavenger free.

EXAMPLE I

Tetraethyllead
2 percent of 1-methyl naphthalene
2 percent of a commercially available o-tert-butylated phenol composition [1] including 2,6-di-tert-butyl phenol.

[1] 2,6-di-tert-butyl phenol, approximately 75 percent; 2,4,6-tri-tert-butyl phenol, approximately 10–15 percent; 2-tert-butyl phenol, approximately 10–15 percent.

EXAMPLE II

Tetraethyllead
5 percent of anthracene
3 percent of 2,6-diisopropyl phenol

EXAMPLE III

Tetrabutyllead
15 percent of commercially available mixture of different fused ring aromatic hydrocarbons characterized by containing mono- and di-alkyl naphthalenes, including ethyl naphthalenes, and dimethyl naphthalenes, with the methyl-substituted naphthalenes predominating.
1.5 percent of 2-methyl-6-tert-butyl phenol.

EXAMPLE IV

Tetraethyllead
5 percent of a commercially available mixture [2] of fused ring aromatic hydrocarbons
2 percent of a commercially available mixture composed predominantly of 2,6-di-tert-butyl phenol with lesser quantities of 2,4,6-tri-tert-butyl phenol and 2-tert-butyl phenol

[2] Initial boiling point—232° C., final boiling point 279° C.; instrumental chemical analysis showed this mixture to contain, inter alia, significant quantities of 2-methyl naphthalene and various dimethyl naphthalenes, principally 1,3-dimethyl naphthalene, 1,4-dimethyl naphthalene, and 1,6-dimethyl naphthalene.

EXAMPLE V

Equimolar mixture of tetramethyllead and tetraethyllead
5 percent of 1-ethyl naphthalene
0.5 percent of phenanthrene
0.5 percent of chrysene
3 percent of 1,4-dimethyl naphthalene
2 percent of 4-methyl-2,6-di-tert-butyl phenol.

EXAMPLE VI

Tetraethyllead
10 percent of a commercially available mixture of fused ring aromatic hydrocarbons including methyl and dimethyl naphthalenes
1.5 percent of 2,6-di-tert-butyl phenol
0.5 percent of 2,4,6-tri-tert-butyl phenol
0.5 percent of 2-tert-butyl phenol

EXAMPLE VII

Tetramethyllead
5 percent of naphthalene
5 percent of kerosene diluent
3 percent of 6,6'-di-tert-butyl-4,4'-bi-o-cresol

EXAMPLE VIII

Tetraethyllead
2 percent of 2,2'-azonaphthalene
2 percent of 2,6-diethyl phenol

EXAMPLE IX

Tetraethyllead
3 percent of azobenzene
2 percent of 2,2',6,6'-tetra-tert-butyl-p,p'-biphenol

EXAMPLE X

Tetraamyllead
1 percent of 4,4'-azotoluene
1 percent of 2,4,6-triisopropyl phenol

EXAMPLE XI

Tetramethyllead
1.5 percent of azocumene
1.5 percent of 4,4'-bis(2,6-diisopropyl phenol)

EXAMPLE XII

Tetramethyllead
4 percent of ethylene glycol
2 percent of 2-isopropyl-6-tert-butyl phenol

EXAMPLE XIII

Diethyldimethyllead
4 percent of 2-methyl-2,4-pentane diol
1 percent of 4-methyl-2,6-di-tert-butyl phenol

EXAMPLE XIV

Tetraethyllead
10 percent of 2-ethyl-1,3-hexane diol
2 percent of 4,4'-methylenebis(2,6-di-tert-butyl phenol)

EXAMPLE XV

Alkyllead mixture composed of tetramethyllead (5.7 percent), methyl triethyllead (26.6 percent), dimethyldiethyllead (37.4 percent), ethyl trimethyllead (23.8 percent), and tetraethyllead (6.2 percent)
7.5 percent 2,2-diethyl-1,3-propane diol
6 percent of 6-isopropyl-o-cresol

EXAMPLE XVI

Tetraethyllead
15 percent of hexachloroethane
1 percent of 4,4'-bis(2,6-di-tert-butyl phenol)

EXAMPLE XVII

Tetraisopropyllead
2 percent of perchlorobutane
0.1 percent of 2,4-di-tert-butyl-o-cresol

EXAMPLE XVIII

Tetramethyllead
20 percent of hexabromoethane
3 percent of 2,4-distyryl phenol

EXAMPLE XIX

Tetraethyllead
10 percent of ethyl thiocyanate
1 percent of 2,2',6,6'-tetra-tert-butyl-p,p'-biphenol

EXAMPLE XX

Tetraoctyllead
5 percent of dodecyl thiocyanate
10 percent of o-tert-butyl phenol

EXAMPLE XXI

Tetraethyllead
0.5 percent of methyl thiocyanate
2 percent of 1,1-bis(3,5-diisopropyl-4-hydroxylphenyl)-methyl methane

EXAMPLE XXII

Ethyltrimethyllead
4 percent of divinyl benzene
1 percent of 2,6-di-tert-butyl phenol

EXAMPLE XXIII

Tetraethyllead
3 percent of styrene
2 percent of 4,4'-methylenebis(2,6-di-tert-butyl phenol)

EXAMPLE XXIV

Tetramethyllead
5 percent of allyl benzene
1 percent of 4-methyl-2,6-di-tert-butyl phenol

EXAMPLE XXV

Tetraethyllead
1 percent of 1,4-divinyl naphthalene
2 percent of o-tert-amyl phenol To illustrate the effectiveness of this invention, direct comparisons were made between the decomposition characteristics of unstabilized and stabilized tetraethyllead. The chief thermal decomposition products of alkyllead compounds are lead metal and hydrocarbon gas. Hence, a very good index of alkyllead thermal decomposition is liberation of this gas. Accordingly, a thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at this high temperature without pronounced thermal decomposition and consequent gas evolution occurring. Consequently, the longer the time, the more thermally stable was the composition.

With pure tetraethyllead used in 1 milliliter amounts, pronounced thermal decomposition occurred practically instantaneously at 195° C. as evidenced by rapid gas evolution.

When the sterically-hindered phenols 2,6-tert-butyl phenol; 4-methyl-2,6-di-tert-butyl phenol; 4,4'-methylenebis(2,6-di-tert-butyl phenol); and 2,2',6,6'-tetra-tert-butyl-p,p'-biphenol were blended with pure tetraethyllead at different concentrations ranging between 0.5 and 3 percent by weight and the resultant mixtures subjected to the above test, pronounced thermal decomposition occurred at 195° C. almost immediately. In other words, these tests showed that the sterically-hindered phenals had no effectiveness whatever as thermal stabilizers for alkyllead compounds.

In sharp contrast to the above results, subjection of the composition of Example I to the above test procedure at 195° C. showed that this composition had greater thermal stability than a corresponding system consisting of tetraethyllead and 5 percent by weight 1-methyl naphthalene (no sterically-hindered phenol present). Thus the addition of 2 percent of the sterically-hindered phenol to pure tetraethyllead plus 2 percent of 1-methyl naphthalene gave a greater thermal stability than 2½ times as much 1-methyl naphthalene in the absence of the phenolic ingredient. Yet the phenolic ingredient by itself was totally without effect as a thermal stabilizer.

By the same token subjection of the compositions of Examples IV and VI to the same test procedure resulted in findings that these compositions had 300 to 400 percent as much thermal stability as the corresponding compositions which were devoid of the sterically-hindered phenol constituents.

Likewise the composition of Example IX was found to have over 3 times as much thermal stability as the same composition not containing the sterically-hindered phenol component. A very similar result was achieved when the effectiveness of the composition of Example XIV was compared with the effectiveness of the corresponding composition not containing the sterically-hindered phenol ingredient. The same general situation was found to prevail in case of the composition of Example XXIII, in this case the phenolic ingredient causing the composition to have over twice the thermal stability possessed by the corresponding phenolic-free composition.

As an example of the striking increases in thermal stability effectiveness characterizing preferred embodiments of this invention it was found that the inclusion of the phenolic ingredient in the composition of Example XVI caused an improvement in thermal stability of over 4000 percent as compared with that possessed by the corresponding phenol-free composition. Similarly the inclusion of the sterically-hindered phenol in the composition of Example XIX was found to improve the thermal stability effectiveness by 1800 percent as compared with the corresponding phenol-free composition.

It is seen from the foregoing experimental data that in every instance the sterically-hindered phenolic ingredients, which normally are totally without effectiveness as thermal stabilizers, cooperated with the remainder of the components of the compositions of this invention in such a fashion as to markedly extend or magnify the thermal stability effectiveness of the system.

It is generally preferable to employ from about 0.5 to about 45 percent by weight of the non-phenolic ingredient and from about 0.1 to about 10 percent by weight of the phenolic ingredient in order to achieve the maximum benefits characteristic of this invention. In other word, for every 100 parts by weight of alkyllead compound one should use from about 0.5 to about 45 parts by weight of the non-phenolic material and from about 0.1 to about 10 parts of the phenolic ingredient. In addition, it is desirable that the total thermal stabilizer content of the compositions of this invention range from about 1 to about 50 percent based on the weight of the alkyllead compound. In other words, from a storage and shipment point of view it is desirable to use a minor proportion of the thermal stabilizer compositions of this invention. It will be understood, however, that departures can be made from the foregoing concentration ranges without detracting substantially from the beneficial results herein described and without departing from the spirit and scope of the invention as defined in the appended claims.

The nature and type of phenolic compounds known in the art as "sterically-hindered phenols" which are applicable to the practice of this invention will now be well known to those skilled in the art. Thus, effective use can be made of such compounds as 2-methyl-6-tert-amyl phenol; o-(1,1,3,3-tetramethylbutyl)phenol; 2-tert-butyl-6-cyclohexyl-p-cresol; 2,2'-methylenebis(6-tert-butyl-4-ethyl phenol); 2,2'-methylenebis(6-tert-butyl-p-cresol); 4,4'-n-butylidenebis(6-tert-butyl-m-cresol); 2-tert-butyl-1-naphthol; and the like.

The fused ring aromatic hydrocarbons employed in various embodiments of this invention include such materials as indene, naphthalene, alkylated naphthalenes, anthracene, alkylated anthracenes, chrysene, the various hydronaphthalenes, the various hydroanthracenes, etc.; and preferably mixtures of such of these materials as meet the criteria set forth hereinabove with respect to the preferred mixtures of fused ring aromatic hydrocarbons.

The azoaromatics used in accordance with this invention as exemplified by such materials as azobenzene, the various azotoluenes, the various azoxylenes, the azonaphthalenes, p,p'-azobiphenyl, and the like.

Typical alkane diols which can be effectively used in the practice of this invention include ethylene glycol; propylene glycol; 2,2-diethyl-1,3-propanediol; 2-methyl-2-propyl-1,3-propanediol; 2-ethyl-2-butyl-1,3-propanediol; neopentyl glycol; 1,5-pentanediol; 2-methyl-1,3-pentanediol; 2,2-dimethyl-1,3-butanediol; 2,2,4-trimethyl-1,3-pentanediol; 2-ethyl-1,3-hexanediol; hexylene glycol; and the like. If desired use can be made of such related glycols and triols as diethylene glycol; triethylene glycol; dipropylene glycol; 1,2,6-hexane triol; and the like.

The perhaloalkanes used in accordance with this invention are exemplified by hexachloroethane, hexabromoethane, octachloropropane, octabromopropane, perchlorobutane, perchloroisobutane, perbromobutane, perbromoisobutane, and the various mixed chloro bromo compounds corresponding to the foregoing.

The alkyl thiocyanates used in this invention are typified by methyl thiocyanate, ethyl thiocyanate, propyl thiocyanate, isopropyl thiocyanate, the several butyl thiocyanates, and the various isomeric pentyl, hexyl, heptyl, octyl, nonyl, decyl, undecyl, and dodecyl thiocyanates.

Illustrative of aralkene hydrocarbons used in the practice of this invention are styrene, alpha methyl styrene, ring substituted styrenes and alpha methyl styrenes (e.g. o-ethyl styrene, p-isopropyl styrene, 3,5-dimethyl styrene, o-methyl-α-methylstyrene, etc.), the vinyl naphthalenes, allyl benzene, the allyl toluenes and related homologs, propenyl benzene and the ring alkylated derivatives thereof, phenyl butenes, phenyl pentenes, and the like. If desired, the aromatic ring of these aralkene hydrocarbons may be chlorinated or brominated, or both. Typical of these compounds which can be used in the practice of this invention are p-chlorostyrene, o-chlorostyrene, o-bromostyrene, etc.

Methods for the preparation of the stabilizer ingredients used in the practice of this invention are well known to those skilled in the art. In fact many of the foregoing ingredients are readily available as articles of commerce.

This invention is useful in stabilizing alkyllead compounds in which at least one valence of the lead is satisfied by an alkyl radical. For example tetraethyllead, tetramethyllead, tetrapropyllead, dimethyldiethyllead, triethylphenyllead, and triethyllead bromide can be successfully stabilized against thermal decomposition at 180–195° C. by incorporating therewith a thermal stabilizer mixture of this invention.

What is claimed is:

1. An alkyllead compound normally susceptible to rapid decomposition at temperatures in the range of 180–195° C. having admixed therewith a minor amount sufficient to inhibit such decomposition of a combination of (1) a sterically-hindered phenol having a total of at least 4 carbon atoms ortho to a phenolic hydroxyl group, said carbon atoms being in the form of from 1 to 2 hydrocarbon radicals selected from the group consisting of alkyl and cyclo-alkyl groups, and (2) a material selected from the group consisting of
   (a) fused ring aromatic hydrocarbons containing from about 9 to about 24 carbon atoms in the molecule;
   (b) azoaromatics in which two aromatic hydrocarbon nuclei, each containing from 6 to about 12 carbon atoms, are chemically bonded to an azo linkage;
   (c) alkane diols containing up to about 12 carbon atoms in the molecule;
   (d) perhaloalkanes containing from 2 to about 4 carbon atoms in the molecule and in which the halogen is taken from the group consisting of chlorine and bromine;
   (e) alkyl thiocyantes containing up to about 12 carbon atoms in the molecule; and
   (f) aralkene hydrocarbons containing from 8 to about 16 carbon atoms in the molecule; said amount being such that for every 100 parts by weight of alkyllead compound there are present from about 0.5 to about 45 parts by weight of said material and from about 0.1 to about 10 parts by weight of said phenol.

2. An alkyllead compound normally susceptible to rapid decomposition at temperatures in the range of 180–195° C. having admixed therewith a minor amount sufficient to inhibit such decomposition of a combination of (1) a sterically-hindered phenol having a total of at least 4 carbon atoms ortho to a phenolic hydroxyl group, said carbon atoms being in the form of from 1 to 2 hydrocarbon radicals selected from the group consisting of alkyl and cycloalkyl groups, and (2) a plurality of different fused ring aromatic hydrocarbons having boiling points at atmospheric pressure of at least about 180° C. and containing up to about 20 carbon atoms in the molecule; said amount being such that for every 100 parts by weight of alkyllead compound there are present from about 0.5 to about 45 parts by weight of said hydrocarbons and from about 0.1 to about 10 parts by weight of said phenol.

3. An alkyllead compound normally susceptible to rapid decomposition at temperatures in the range of 180–195° C. having admixed therewith a minor amount sufficient to inhibit such decomposition of a combination of (1) a sterically-hindered phenol having a total of at least 4 carbon atoms ortho to a phenolic hydroxyl group, said carbon atoms being in the form of from 1 to 2 hydrocarbon radicals selected from the group consisting of alkyl and cycloalkyl groups, and (2) a perhaloalkane containing from 2 to about 4 carbon atoms in the molecule and in which the halogen is taken from the group consisting of chlorine and bromine; said amount being such that for every 100 parts by weight of alkyllead compound there are present from about 0.5 to about 45 parts by weight of said perhaloalkane and from about 0.1 to about 10 parts by weight of said phenol.

4. An alkyllead compound normally susceptible to rapid decomposition at temperatures in the range of 180–195° C. having admixed therewith a minor amount sufficient to inhibit such decomposition of a combination of (1) a sterically-hindered phenol having a total of at least 4 carbon atoms ortho to a phenolic hydroxyl group, said carbon atoms being in the form of from 1 to 2 hydrocarbon radicals selected from the group consisting of alkyl and cycloalkyl groups, and (2) an alkyl thiocyanate containing up to about 12 carbon atoms in the molecule; said amount being such that for every 100 parts by weight of alkyllead compound there are present from about 0.5 to about 45 parts by weight of said thiocyanate and from about 0.1 to about 10 parts by weight of said phenol.

5. The composition of claim 1 wherein said alkyllead compound is tetraethyllead.

6. A composition of claim 1 wherein said alkyllead compound is tetramethyllead.

7. The composition of claim 1 wherein said phenol is a 2,6-di-tert-butylated phenolic compound.

8. The composition of claim 1 wherein said phenol includes 2,6-di-tert-butyl phenol.

9. The composition of claim 2 wherein said phenol is a 2,6-di-tert-butylated phenolic compound.

10. The composition of claim 2 wherein said phenol includes 2,6-di-tert-butyl phenol.

11. The composition of claim 2 wherein said alkyllead compound is tetraethyllead.

12. The composition of claim 2 wherein said alkyllead compound is tetraethyllead and said phenol is a 2,6-di-tert-butylated phenolic compound.

References Cited in the file of this patent

UNITED STATES PATENTS

| | | |
|---|---|---|
| 2,660,591 | Calingaert et al. | Nov. 24, 1953 |
| 2,660,592 | Calingaert et al. | Nov. 24, 1953 |
| 2,660,593 | Calingaert et al. | Nov. 24, 1953 |
| 2,660,594 | Calingaert et al. | Nov. 24, 1953 |
| 2,660,595 | Calingaert et al. | Nov. 24, 1953 |
| 2,660,596 | Calingaert et al. | Nov. 24, 1953 |
| 2,727,053 | Krohn | Dec. 13, 1955 |
| 2,865,722 | Shepherd | Dec. 23, 1958 |
| 2,917,377 | Smith | Dec. 15, 1959 |